(12) United States Patent
Seki et al.

(10) Patent No.: US 11,013,012 B2
(45) Date of Patent: May 18, 2021

(54) BASE STATION DEVICE AND COMMUNICATION METHOD THEREOF

(71) Applicant: Panasonic Intellectual Property Management Co., Ltd., Osaka (JP)

(72) Inventors: Yuta Seki, Osaka (JP); Yuma Inaba, Kanagawa (JP); Richol Ku, Kanagawa (JP)

(73) Assignee: Panasonic Intellectual Property Management Co., Osaka (JP)

(*) Notice: Subject to any disclaimer, the term of this patent is extended or adjusted under 35 U.S.C. 154(b) by 0 days.

(21) Appl. No.: 16/487,685

(22) PCT Filed: Apr. 19, 2017

(86) PCT No.: PCT/JP2017/015643
§ 371 (c)(1),
(2) Date: Aug. 21, 2019

(87) PCT Pub. No.: WO2018/158967
PCT Pub. Date: Sep. 7, 2018

(65) Prior Publication Data
US 2020/0059937 A1 Feb. 20, 2020

(30) Foreign Application Priority Data

Feb. 28, 2017 (JP) .............................. JP2017-037284

(51) Int. Cl.
*H04W 4/00* (2018.01)
*H04W 72/08* (2009.01)
(Continued)

(52) U.S. Cl.
CPC ........ *H04W 72/082* (2013.01); *H04B 7/2656* (2013.01); *H04W 48/10* (2013.01);
(Continued)

(58) Field of Classification Search
None
See application file for complete search history.

(56) References Cited

U.S. PATENT DOCUMENTS 5,652,752 A * 7/1997 Suzuki ................. H04B 7/2643
370/330
6,471,758 B1 * 10/2002 Kelderman ............ C09D 11/34
106/31.29
(Continued)

FOREIGN PATENT DOCUMENTS

JP 2000-253444 A 9/2000
JP 2002-218528 A 8/2002
(Continued)

OTHER PUBLICATIONS

Sumitomo (JP 2010-1187 A published on May 27, 2010, machine translation) (Year: 2010).*

(Continued)

*Primary Examiner* — Clemence S Han
(74) *Attorney, Agent, or Firm* — Seed IP Law Group LLP

(57) ABSTRACT

A base station device includes: a receiver, which, in operation, receives signals from one or more other base station devices in a system using an adjacent frequency band; a searcher, which, in operation, searches for one or more center frequencies of signals from the one or more other base station devices; a selector, which, in operation, selects a synchronization target base station device from which a respective center frequency has been acquired from among the one or more other base station devices; and a controller, which, in operation, sets an operation parameter to establish synchronization with transmission and reception timings of the synchronization target base station device.

7 Claims, 7 Drawing Sheets

(51) Int. Cl.
    *H04B 7/26*     (2006.01)
    *H04W 48/10*     (2009.01)
    *H04W 56/00*     (2009.01)
    *H04W 72/00*     (2009.01)
    *H04W 72/04*     (2009.01)

(52) U.S. Cl.
    CPC ....... *H04W 56/001* (2013.01); *H04W 72/005* (2013.01); *H04W 72/044* (2013.01)

(56) References Cited

U.S. PATENT DOCUMENTS

| | | | |
|---|---|---|---|
| 2008/0240072 A1* | 10/2008 | Bykovnikov | H04W 88/08 370/350 |
| 2010/0216478 A1* | 8/2010 | Buddhikot | H04W 16/14 455/450 |
| 2011/0103367 A1 | 5/2011 | Ishii | |
| 2011/0235584 A1 | 9/2011 | Chen et al. | |
| 2011/0280223 A1 | 11/2011 | Maeda et al. | |
| 2012/0069943 A1* | 3/2012 | Lim | H04B 7/1851 375/371 |
| 2012/0201218 A1* | 8/2012 | Yamamoto | H04B 7/269 370/329 |
| 2013/0003716 A1* | 1/2013 | Nanri | H04W 16/32 370/350 |
| 2013/0040688 A1 | 2/2013 | Mizusawa | |
| 2016/0330704 A1* | 11/2016 | Takahashi | H04W 72/005 |

FOREIGN PATENT DOCUMENTS

| | | |
|---|---|---|
| JP | 2010-118726 A | 5/2010 |
| JP | 2011-082831 A | 4/2011 |
| JP | 2012-049642 A | 3/2012 |
| JP | 2012-518927 A | 8/2012 |
| JP | 2013-007039 A | 1/2013 |
| JP | 2013-038585 A | 2/2013 |
| JP | 2013-528004 A | 7/2013 |
| JP | 2015-142234 A | 8/2015 |
| JP | 2017-005451 A | 1/2017 |
| WO | 2009/022668 A1 | 2/2009 |
| WO | 2010/087172 A1 | 8/2010 |
| WO | 2010/094482 A1 | 8/2010 |
| WO | 2011/108202 A1 | 9/2011 |

OTHER PUBLICATIONS

International Search Report, dated Jun. 20, 2017, for corresponding International Application No. PCT/JP2017/015643, 4 pages.

Softbank Mobile Corporation, "Public hearing on the 4th generation mobile communication system", Material No. 5, Jan. 23, 2014, 32 pages. (With English Translation).

* cited by examiner

BASE STATION DEVICE AND COMMUNICATION METHOD THEREOF

This application is a U.S. national stage application of the PCT International Application No. PCT/JP2017/015643 filed on Apr. 19, 2017, which claims the benefit of foreign priority of Japanese patent application 2017-037284 filed on Feb. 28, 2017, the contents all of which are incorporated herein by reference.

TECHNICAL FIELD

The present disclosure relates to a base station device and a communication method in the base station device.

BACKGROUND ART

A network listening technique, which is being developed, controls interference between the base stations that have cell regions overlapping each other in the identical system using the same frequency band (see PTL 1). In the identical system, each base station knows resources used by other base stations. Thus, the interference can be avoided by using a resource that is not used by the other base stations.

In a case of two different systems using adjacent frequency bands, a sufficiently wide guard band is conventionally provided between the adjacent frequency bands to reduce the interference between the adjacent frequency bands. For existing local broadband wireless access (BWA) systems using a 2.5 GHz band, for example, frequency bands ranging from 2575 MHz to 2582 MHz and from 2592 MHz to 2595 MHz are fixedly provided, as guard bands, within an allocated frequency band ranging from 2575 MHz to 2595 MHz.

CITATION LIST

Patent Literature

PTL 1: Unexamined Japanese Patent Publication No. 2017-005451

SUMMARY OF THE INVENTION

Setting guard bands in the above manner, however, may result in decreasing frequency use efficiency.

An aspect of the present disclosure discloses a base station device and a communication method in this base station device, both of which can suppress interference between adjacent frequency bands while narrowing or removing guard bands, and can thereby improve frequency use efficiency.

A base station device according to an aspect of the present disclosure performs a process of converting a frequency domain signal into a time domain signal during a transmission process and a process of converting the time domain signal into the frequency domain signal during a reception process. The base station device includes: a receiver that receives signals from one or more other base station devices in a system using an adjacent frequency band, each of the one or more other base station devices performing the process of converting the frequency domain signal into the time domain signal during the transmission process and the process of converting the time domain signal into the frequency domain signal during the reception process; a searcher that searches for one or more center frequencies of signals from the one or more other base station devices; a selector that selects a synchronization target base station from which a respective center frequency has been acquired from among the one or more base station devices; and a controller that sets an operation parameter to establish synchronization with transmission and reception timings of the synchronization target base station.

A communication method according to another aspect of the present disclosure is a communication method in a base station device that performs a process of converting a frequency domain signal into a time domain signal during a transmission process and a process of converting the time domain signal into the frequency domain signal during a reception process. The communication method includes: receiving signals from one or more other base station devices in a system using an adjacent frequency band, each of the one or more other base station devices performing the process of converting the frequency domain signal into the time domain signal during the transmission process and the process of converting the time domain signal into the frequency domain signal during the reception process; searching for one or more center frequencies of signals from the one or more other base station devices; selecting a synchronization target base station from which a respective center frequency has been acquired from among the one or more base station devices; setting an operation parameter to establish synchronization with transmission and reception timings of the synchronization target base station; and conducting communication with a terminal in accordance with the operation parameter.

According to an aspect of the present disclosure, it is possible to suppress interference between adjacent frequency bands while narrowing or removing guard bands, and thereby to improve frequency use efficiency.

DESCRIPTION OF EMBODIMENTS

With reference to the drawings as appropriate, some exemplary embodiments of the present disclosure will be described below in detail. It should be noted that the accompanying drawings and the following description are provided to help those skilled in the art fully understand the present disclosure and not intended to limit subject matters as described in the claims.

First Exemplary Embodiment

<Configuration of Wireless Communication System>

Figure 1:
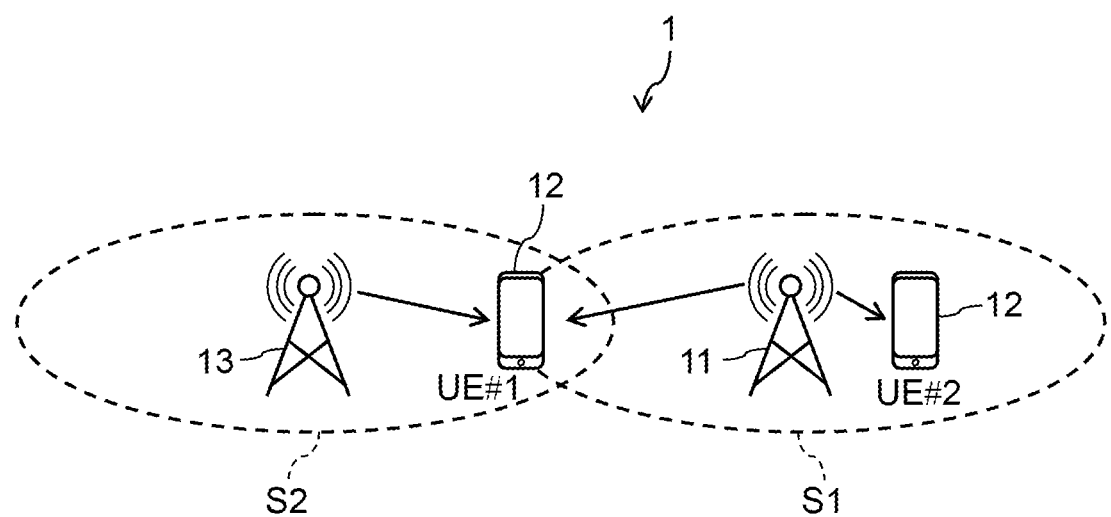
FIG. 1 illustrates a configuration of a wireless communication system according to a first exemplary embodiment.

With reference to FIG. 1, a description will be given below in detail of a configuration of wireless communication system 1 according to a first exemplary embodiment of the present disclosure.

Wireless communication system 1 includes base station device 11, terminals 12, and synchronization target base station 13, which is another base station. Each of base station device 11, terminals 12, and synchronization target base station 13 performs a process of converting a frequency domain signal into a time domain signal during a transmission process and a process of converting the time domain signal into the frequency domain signal during a reception process. For example, in an orthogonal frequency division multiplexing or single carrier frequency division multiple access system, an inverse fast Fourier transform (IFFT) may be used as the process of converting the frequency domain signal into the time domain signal, and a fast Fourier transform (FFT) may be used as the process of converting the time domain signal into the frequency domain signal. In a long term evolution (LTE) system, a cyclic prefix (CP) is added to the time domain signal.

Base station device 11 searches for center frequencies of downlink signals received from other base stations in a system using an adjacent frequency band, and then selects synchronization target base station 13 from among the other base stations from which respective center frequencies can be acquired. Base station device 11 acquires reception information contained in a downlink signal from the selected synchronization target base station 13 and, based on this acquired reception information, sets an operation parameter so as to be synchronized with transmission and reception timings of synchronization target base station 13. In accordance with the operation parameter set in this manner, base station device 11 transmits downlink signals to terminals 12. Moreover, base station device 11 receives uplink signals transmitted from terminals 12 within its cell S1 and then subjects these received uplink signals to a predetermined process, thereby acquiring data or information contained in the uplink signals.

Each terminal 12 receives the downlink signal transmitted from base station device 11 within cell S1 of base station device 11 and subjects this received downlink signal to a predetermined process, thereby acquiring data or information contained in the downlink signal. In this case, terminal 12 (UE#1 in FIG. 1) is present within an area in which a cell edge of cell S1 of base station device 11 overlaps a cell edge of cell S2 of synchronization target base station 13, which is a base station installed adjacent to base station device 11. Even so, terminal 12 can communicate with base station device 11 without being greatly interfered by synchronization target base station 13. Terminal 12 generates a signal containing predetermined data or information and then wirelessly transmits this generated signal to base station device 11.

Synchronization target base station 13 belongs to a system different from a system of base station device 11 and conducts communication.

<Configuration of Base Station Device>

Figure 2:
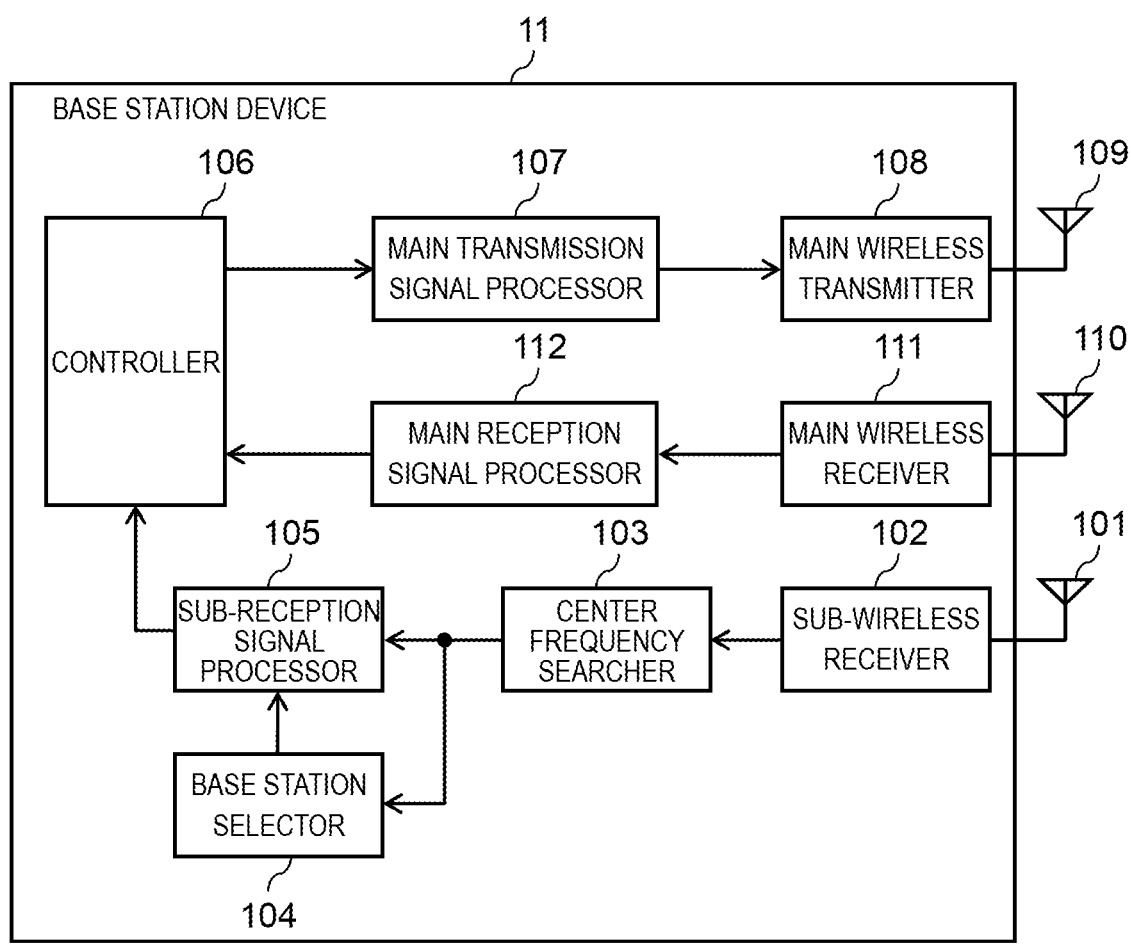
FIG. 2 is a block diagram illustrating a configuration of a base station device according to the first exemplary embodiment.
Figure 3:
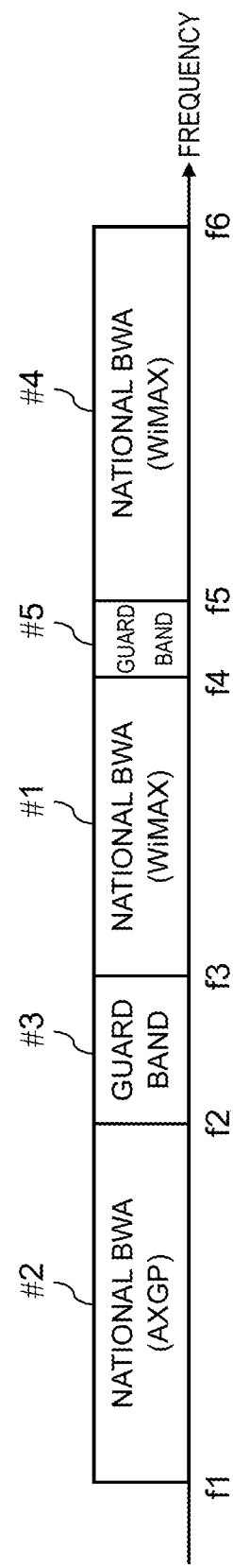
FIG. 3 illustrates a frequency band of each of the base station device and a synchronization target base station according to the first exemplary embodiment.

With reference to FIGS. 2 and 3, a description will be given below in detail of a configuration of base station device 11 according to the first exemplary embodiment of the present disclosure.

Base station device 11 includes antenna 101, sub-wireless receiver 102, center frequency searcher 103, base station selector 104, sub-reception signal processor 105, controller 106, main transmission signal processor 107, main wireless transmitter 108, antenna 109, antenna 110, main wireless receiver 111, and main reception signal processor 112.

Sub-wireless receiver 102 receives, via antenna 101, downlink wireless signals transmitted from other base stations in systems that use a frequency band adjacent to the frequency band used by base station device 11. Then, sub-wireless receiver 102 subjects the received downlink wireless signals to a wireless reception process, such as down-converting or amplifying, and outputs resultant baseband signals to center frequency searcher 103.

Center frequency searcher 103 searches for center frequencies of the downlink baseband signals received from sub-wireless receiver 102. Then, center frequency searcher 103 outputs a result of searching for the center frequencies to both base station selector 104 and sub-reception signal processor 105 together with the downlink baseband signals.

Based on the result of searching for the center frequencies received from center frequency searcher 103, base station selector 104 selects a synchronization target base station from among the base stations from which respective center frequencies can be acquired. For example, base station selector 104 may select the synchronization target base station from among the other base stations having received powers equal to or more than a threshold.

More specifically, base station selector 104 selects one of the other base stations which has the maximum received power, one of the other base stations which is positioned at the shortest distance, or one of the other base stations which uses a frequency band whose center frequency is closest to a center frequency of a frequency band used by the base station device itself, and then designates the selected base station as the synchronization target base station. Alternatively, base station selector 104 may select the synchronization target base station from a combination of the above. In this case, base station selector 104 can select the other base station having the maximum received power as the other base station positioned at the shortest distance. When selecting the synchronization target base station from the combination of the above, base station selector 104 can select the synchronization target base station, based on scores obtained by weighting the received powers, differences between the center frequencies, and the distances.

Sub-reception signal processor 105 subjects the downlink baseband signal that center frequency searcher 103 has received from the synchronization target base station selected by base station selector 104 to a predetermined reception process, such as an FFT, demodulating, or decoding. In this way, sub-reception signal processor 105 acquires reception information on the synchronization target base station. This reception information may be information that contains: a wireless frame timing detected based on a synchronization channel signal; master information block (MIB) information, such as traffic, acquired from a physical broadcast channel (PBCH) signal; information (SIB1 information) associated with whether the synchronization target base station is permitted to belong to its cell which is acquired from a physical downlink shared channel (PDSCH) signal; and reference signal received power (RSRP) measured with a cell specific reference signal (CRS). In this case, a primary cell identification (ID) of the synchronization target base station may be determined upon detection of the wireless frame timing. Information associated with an operation frequency band and a system frame number (SFN) may be contained in the MIB information. A time division duplex (TDD) frame structure may be contained in SIB1.

Sub-reception signal processor 105 outputs the acquired reception information to controller 106.

Based on the reception information on the synchronization target base station received from sub-reception signal processor 105, controller 106 sets an operation parameter of the base station device itself so as to be synchronized with transmission and reception timings of synchronization target base station 13. Examples of the operation parameter include a wireless frame timing, a primary cell ID, transmitted power, and a resource block (RB) used. If the synchronization target base station employs a TDD system, the operation parameter may also contain a TDD frame structure. In this case, the primary cell ID may be an ID different from that of the synchronization target base station. To achieve the synchronization with the transmission and reception timings, controller 106 requires at least the information on the wireless frame timing. If the synchronization alone with the transmission and reception timings is insufficient to reduce the interference between the synchronization target base station, controller 106 can set the transmitted power and a resource block used such that the interference between the synchronization target base station falls within an allowable range, and can report information on the maximum value of the transmitted power set in this manner to the terminal in a cell S1 of base station device 11.

Controller 106 controls main transmission signal processor 107 in such a way that a guard band is provided between an operation frequency band of a downlink signal to be transmitted to a terminal within its cell S1 and the adjacent frequency band used by the synchronization target base station, or in such a way that that no guard band is provided. In addition, controller 106 controls main transmission signal processor 107 in such a way that a downlink signal is generated in accordance with the set operation parameter. Furthermore, controller 106 analyzes an uplink baseband signal received from main reception signal processor 112 whose frequency band is identical to the frequency band used for the downlink signal transmitted to the terminal within its cell S1, thereby acquiring various information contained in the uplink baseband signal.

Main transmission signal processor 107 subjects downlink data to a transmission process, such as coding, modulating, or an IFFT, based on the operation parameter set by controller 106. Then, main transmission signal processor 107 outputs a resultant downlink baseband signal to main wireless transmitter 108. As illustrated in FIG. 3, the downlink baseband signal output from main transmission signal processor 107 contains guard band #3 between operation frequency band #1 and adjacent frequency band #2 used by the synchronization target base station. However, if controller 106 performs the control in such a way that no guard band is set, the downlink baseband signal output from main transmission signal processor 107 does not contain a guard band.

Main wireless transmitter 108 subjects the downlink baseband signal received from main transmission signal processor 107 to a wireless transmission process, such as up-converting or amplifying. Then, main wireless transmitter 108 transmits a resultant downlink wireless signal via antenna 109.

Main wireless receiver 111 subjects the uplink wireless signal received from the terminal within its cell via antenna 110 to a wireless reception process, such as down-converting or amplifying. Then, main wireless receiver 111 outputs a resultant uplink baseband signal to main reception signal processor 112.

Main reception signal processor 112 subjects the uplink baseband signal received from main wireless receiver 111 to a reception process, such as an FFT, demodulating, or decoding. Then, main reception signal processor 112 outputs uplink data to controller 106.

One example of a system used by synchronization target base station 13 is an advanced extended global platform (AXGP) in a national broadband wireless access (BWA) system, as illustrated in FIG. 3. One example of a system used by base station device 11 is worldwide interoperability for microwave access (WiMAX) in a local BWA system.

The downlink signal transmitted from base station device 11 is generated and transmitted based on the operation parameter that has been set so as to be synchronized with the transmission and reception timings of synchronization target base station 13. Thus, even when guard band #3 is made narrower, the downlink signal can be received by terminal 12 without interfering with a downlink signal in the adjacent frequency band which is transmitted from synchronization target base station 13.

If the system that uses frequency #4 adjacent to a frequency used by base station device 11 (for example, WiMAX in the national BWA system) is identical to the system used by base station device 11, it is possible to ensure the synchronization without using the system in this exemplary embodiment. Consequently, it is possible to make guard band #5 narrower as illustrated in FIG. 3.

<Effect>

As described above, the configuration according to this exemplary embodiment searches for center frequencies of signals from other base stations in systems using an adjacent frequency band, then selects synchronization target base station 13 from among the base stations from which respective center frequencies can be acquired, and sets an operation parameter so as to be synchronized with transmission and reception timings of synchronization target base station 13. In this way, it is possible to suppress interference between adjacent frequency bands while narrowing or removing guard bands, and thereby to improve frequency use efficiency.

Second Exemplary Embodiment

<Configuration of Wireless Communication System>

Figure 4:
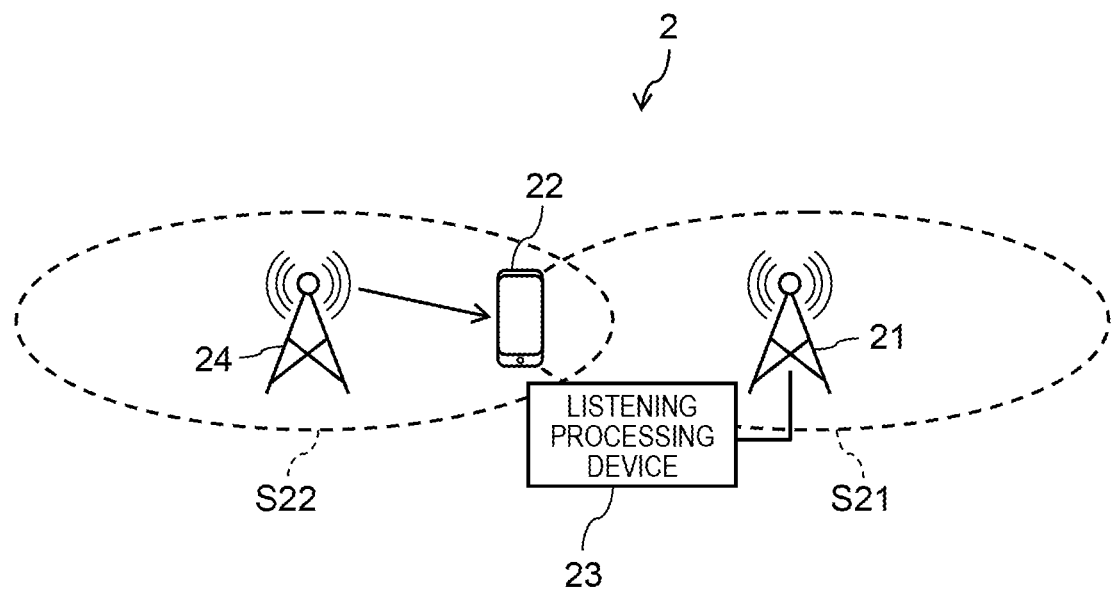
FIG. 4 illustrates a configuration of a wireless communication system according to a second exemplary embodiment.

With reference to FIG. 4, a description will be given below in detail of a configuration of wireless communication system 2 according to a second exemplary embodiment of the present disclosure.

Wireless communication system 2 includes base station device 21, terminal 22, listening processing device 23, and synchronization target base station 24, which is another base station.

Listening processing device 23 searches for center frequencies of downlink signals received from base stations in system using a frequency band adjacent to a frequency used by base station device 21, and selects synchronization target base station 24 from among the base stations from which respective center frequencies can be acquired. Then, listening processing device 23 acquires reception information contained in the downlink signal from selected synchronization target base station 24 and transmits the acquired reception information to base station device 21 via a cable. Alternatively, listening processing device 23 may wirelessly transmit the acquired reception information to base station device 21.

Based on the reception information received from listening processing device 23, base station device 21 sets an operation parameter so as to be synchronized with transmission and reception timings of synchronization target base station 24. In accordance with the operation parameter set in this manner, base station device 21 transmits a downlink signal to terminal 22. Moreover, base station device 21 receives an uplink signal transmitted from terminal 22 within its cell S21 and then subjects this received uplink signal to a predetermined process, thereby acquiring data or information contained in the uplink signal.

Terminal 22 receives the downlink signal transmitted from base station device 21 within cell S21 of base station device 21, and then subjects this received downlink signal to a predetermined process, thereby acquiring data or information contained in the downlink signal. In this case, terminal 22 is present within an area in which a cell edge of cell S21 of base station device 21 overlaps a cell edge of cell S22 of synchronization target base station 24, which is a base station installed adjacent to base station device 21. Even so, terminal 22 can communicate with base station device 21 without being interfered by synchronization target base station 24. Terminal 22 generates a signal containing predetermined data or information and then wirelessly transmits this generated signal to base station device 21.

<Configuration of Listening Processing Device>

Figure 5:
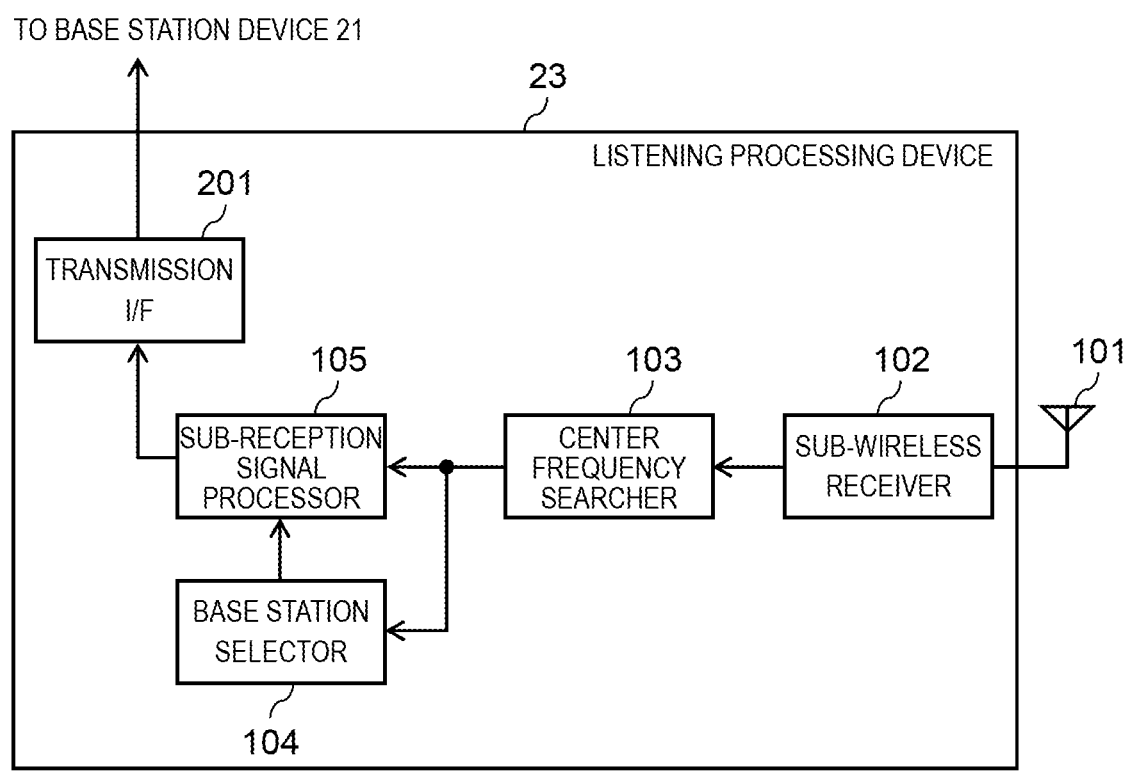
FIG. 5 is a block diagram illustrating a configuration of a listening processing device according to the second exemplary embodiment.

With reference to FIG. 5, a description will be given below in detail of a configuration of listening processing device 23 according to the second exemplary embodiment of the present disclosure.

In FIG. 5, parts having configurations identical to the configurations in FIG. 2 are given the same characters and will not be described.

Listening processing device 23 includes sub-wireless receiver 102, center frequency searcher 103, base station selector 104, sub-reception signal processor 105, and transmission interface (I/F) 201.

Sub-reception signal processor 105 outputs the acquired reception information to transmission I/F 201.

Transmission I/F 201 transmits the reception information received from sub-reception signal processor 105 to base station device 21 (reception I/F 301) via the cable.

<Configuration of Base Station Device>

Figure 6:
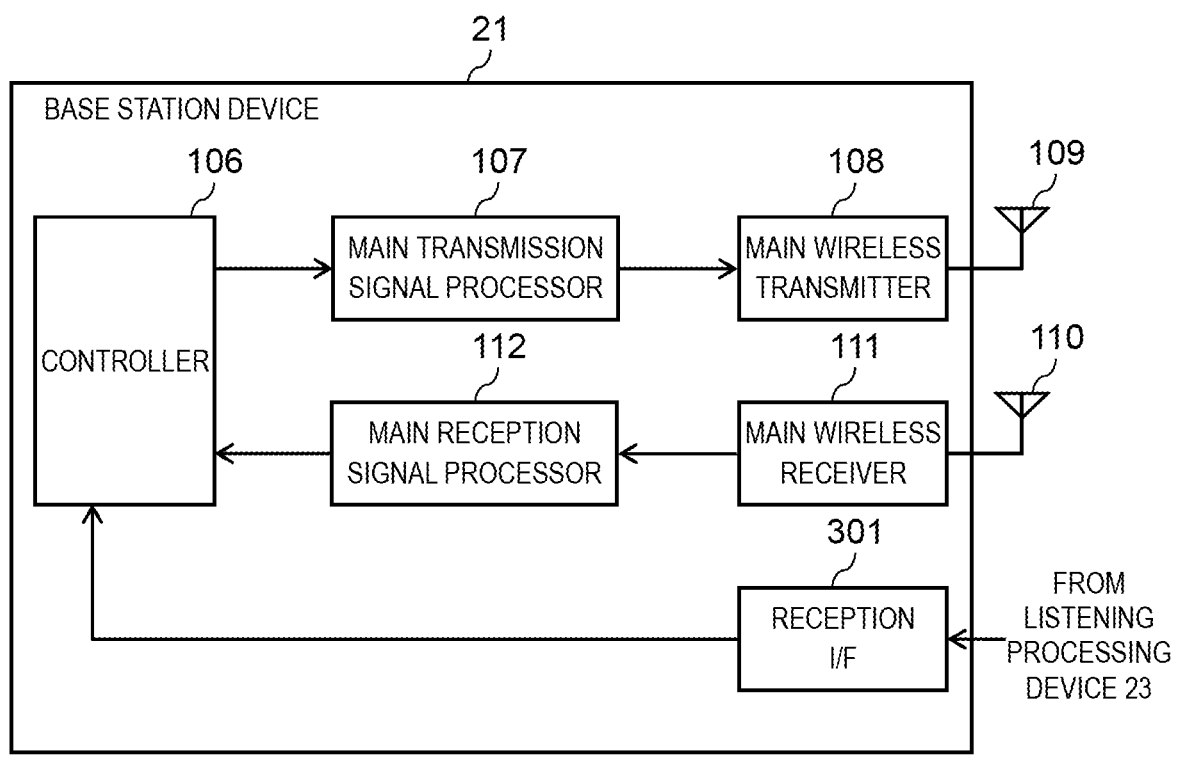
FIG. 6 is a block diagram illustrating a configuration of a base station device according to the second exemplary embodiment.

With reference to FIG. 6, a description will be given below in detail of a configuration of base station device 21 according to the second exemplary embodiment of the present disclosure.

In FIG. 6, parts having configurations identical to the configurations in FIG. 2 are given the same characters and will not be described.

Base station device 21 includes controller 106, main transmission signal processor 107, main wireless transmitter 108, antenna 109, antenna 110, main wireless receiver 111, main reception signal processor 112, and reception I/F 301.

Reception I/F 301 acquires the reception information on the synchronization target base station from listening processing device 23. Reception I/F 301 outputs the acquired reception information to controller 106.

Based on the reception information on the synchronization target base station received from reception I/F 301, controller 106 sets an operation parameter of the base station device itself so as to be synchronized with the transmission and reception timings of synchronization target base station 13.

In the above case, one example of a system used by synchronization target base station 24 is an AXGP in a national BWA system. One example of a system used by base station device 21 is a local WiMAX in a local BWA system.

The downlink signal transmitted from base station device 21 is generated and transmitted based on the operation parameter that has been set so as to be synchronized with the transmission and reception timings of synchronization target base station 24. Thus, even when a guard band is made narrower, the downlink signal can be received by terminal 22 without interfering with a downlink signal in the adjacent frequency band which is transmitted from synchronization target base station 24.

According to this exemplary embodiment, as described above, listening processing device 23 searches for and selects a synchronization target base station and acquires reception information on the synchronization target base station. Then, base station device 21 acquires the reception information on the synchronization target base station from listening processing device 23 and sets an operation parameter. In this way, this exemplary embodiment can achieve the same effect as the effect of the foregoing first exemplary embodiment and can further improve frequency use efficiency by suppressing interference between adjacent frequency bands while narrowing or removing guard bands even if base station device 21 fails to search for the center frequency of synchronization target base station 24 or fails to acquire the reception information on synchronization target base station 24.

Another Exemplary Embodiment

Figure 7:
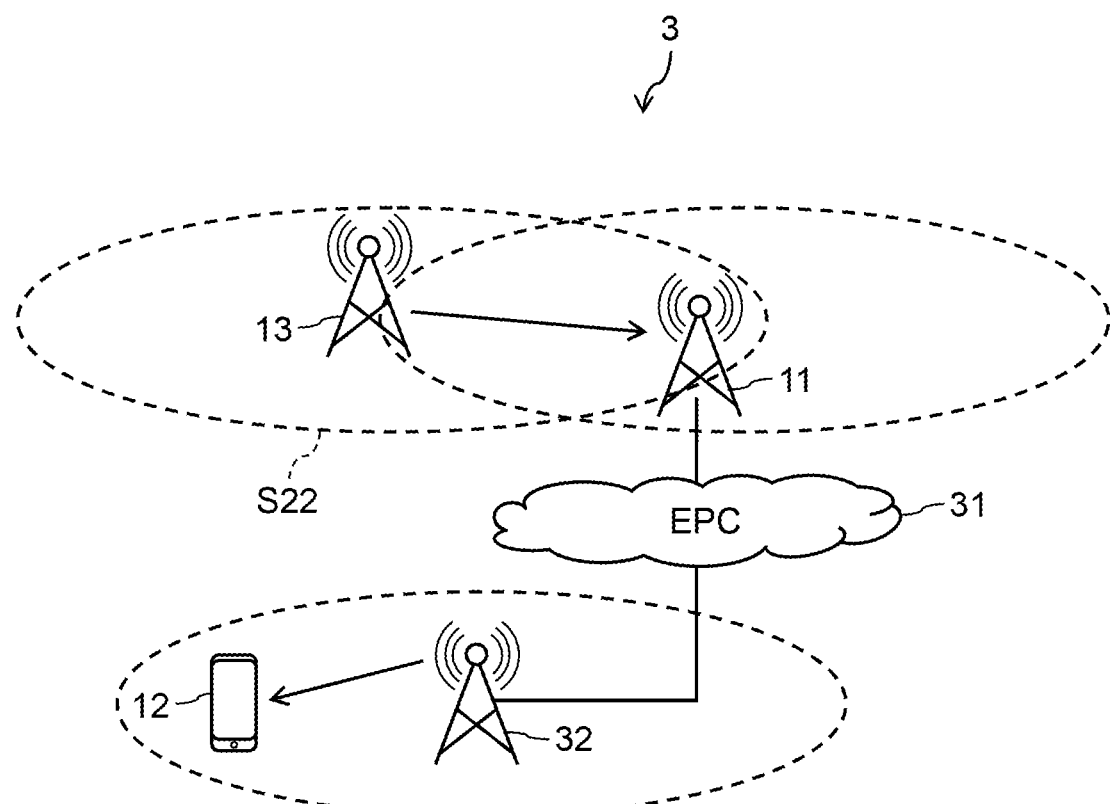
FIG. 7 illustrates a configuration of a wireless communication system according to another exemplary embodiment.

With reference to FIG. 7, a description will be given below in detail of a configuration of wireless communication system 3 according to another exemplary embodiment of the present disclosure.

In FIG. 7, parts having configurations identical to the configurations in FIG. 1 are given the same characters and will not be described.

Wireless communication system 3 includes: base station device 11; terminal 12; synchronization target base station 13, which is another base station; evolved packet core (EPC) 31; and another base station 32 that is independent of the synchronization target base station.

EPC 31 includes: a mobility management entity (MME) that handles a control plane (C-plane) for network control, a serving gateway (S-GW) that handles a user plane (U-plane) serving as packet data of user data, and a packet data network gateway (PDN or P-GW) for connecting to an external network such as the Internet.

EPC 31 is a host station for both base station device 11 and another base station 32 and connected to a network such as the Internet. EPC 31 receives an operation parameter from base station device 11 and transmits this operation parameter to another base station 32.

Another base station 32 belongs to a system identical to a system to which base station device 11 belongs. However, another base station 32 conducts communication by using a frequency band different from a frequency band used by base station device 11. Another base station 32 sets the operation parameter received from EPC 31 and transmits a downlink signal to terminal 12 in accordance with the set operation parameter.

Note that, in the present disclosure, kinds, disposition, a number of members, and the like are not limited to the above-described exemplary embodiments, and for example, the components are appropriately replaced to components having similar actions and effects, whereby the exemplary embodiments can be modified as appropriate without departing from the spirit of the present disclosure.

INDUSTRIAL APPLICABILITY

The present disclosure is suitably applicable to base station devices.

REFERENCE MARKS IN THE DRAWINGS 1, 2, 3: wireless communication system
11, 21: base station device
12, 22: terminal
13, 24: synchronization target base station
23: listening processing device
31: EPC
32: another base station
101, 109, 110: antenna
102: sub-wireless receiver
103: center frequency searcher
104: base station selector
105: sub-reception signal processor
106: controller
107: main transmission signal processor
108: main wireless transmitter
111: main wireless receiver
112: main reception signal processor
201: transmission I/F
301: reception I/F

The invention claimed is:

1. A base station device, comprising:
a main transmitter, which, in operation, performs, based on an operation parameter, processes of converting a first downlink baseband signal in a frequency domain into a time domain signal, upconverting the time domain signal into a first frequency band, and transmitting the upconverted signal;
a main receiver, which, in operation, performs, based on the operation parameter, processes of receiving an uplink signal in the first frequency band, downconverting the received uplink signal into a time domain signal, and converting the time domain signal into an uplink baseband signal in a frequency domain;
a sub-receiver, which, in operation, receives downlink signals sent to one or more terminals from one or more other base station devices in a system using a second frequency band adjacent to the first frequency band, and downconverts the downlink signals into second downlink baseband signals, each of the one or more other base station devices performing a process of converting the frequency domain signal into the time domain signal during a transmission process and a process of converting the time domain signal into the frequency domain signal during a reception process;
a searcher, which, in operation, searches for one or more center frequencies of the second downlink baseband signals;
a selector, which, in operation, selects a synchronization target base station device from which a respective center frequency has been acquired from among the one or more other base station devices; and
a controller, which, in operation, sets the operation parameter to establish synchronization with transmission and reception timings of the synchronization target base station device.

2. The base station device according to claim 1, wherein the sub-receiver performs the process of converting the time domain signal into the frequency domain signal on the second downlink baseband signals from the one or more other base station devices and measures reference signal received powers (RSRPs) by using reference signals of the one or more other base station devices, and
the selector selects, as the synchronization target base station device, one of the one or more other base station devices that has a maximum RSRP.

3. The base station device according to claim 1, wherein the sub-receiver performs the process of converting the time domain signal into the frequency domain signal on a downlink baseband signal among the second downlink baseband signals from the synchronization target base station device and detects a wireless frame timing based on a synchronization channel signal of the synchronization target base station device, and
the controller sets the operation parameter to a transmission timing that is synchronized with a radio frame transmission and reception timings of the synchronization target base station device.

4. The base station device according to claim 1, wherein the sub-receiver performs the process of converting the time domain signal into the frequency domain signal on a downlink baseband signal among the second downlink baseband signals from the synchronization target base station device and acquires master information block (MIB) information from a physical broadcast channel (PBCH) signal of the synchronization target base station device, and
the controller sets the operation parameter to a transmission timing that is synchronized with a system frame number (SFN) of the synchronization target base station device.

5. The base station device according to claim 1, wherein the sub-receiver performs the process of converting the time domain signal into the frequency domain signal on a downlink baseband signal among the second downlink baseband signals from the synchronization target base station device and acquires MIB information from a physical broadcast channel (PBCH) signal of the synchronization target base station device, and
the controller sets the operation parameter to transmitted power.

6. The base station device according to claim 1, wherein the sub-receiver performs the process of converting the time domain signal into the frequency domain signal on a downlink baseband signal among the second downlink baseband signals from the synchronization target base station device and acquires MIB information from a physical broadcast channel (PBCH) signal of the synchronization target base station device, and
the controller sets the operation parameter to a resource block (RB) used.

7. The base station device according to claim 1, wherein the sub-receiver performs the process of converting the time domain signal into the frequency domain signal on a downlink baseband signal among the second downlink baseband signals from the synchronization target base station device and acquires system information block type 1 (SIB1) information from a physical downlink shared channel (PDSCH) signal of the synchronization target base station device, and
when the synchronization target base station device is in a time division duplex (TDD) frame system, the controller sets the operation parameter to a TDD frame structure identical to a TDD frame structure of the synchronization target base station device.

\* \* \* \* \*